(12) United States Patent
Suzuki et al.

(10) Patent No.: US 7,764,301 B2
(45) Date of Patent: Jul. 27, 2010

(54) OPTICAL SCANNING DEVICE AND IMAGE FORMING APPARATUS

(75) Inventors: Seizo Suzuki, Chiba (JP); Yoshinori Hayashi, Kanagawa (JP); Tadashi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/026,931

(22) Filed: Feb. 6, 2008

(65) Prior Publication Data

US 2008/0204841 A1 Aug. 28, 2008

(30) Foreign Application Priority Data

Feb. 22, 2007 (JP) .............................. 2007-042520

(51) Int. Cl.
*B41J 2/47* (2006.01)
*B41J 2/435* (2006.01)

(52) U.S. Cl. ...................... 347/235; 347/250

(58) Field of Classification Search ........................ None
See application file for complete search history.

(56) References Cited

U.S. PATENT DOCUMENTS

| | | | |
|---|---|---|---|
| 6,462,853 B2 | 10/2002 | Hayashi | |
| 6,587,245 B2 | 7/2003 | Hayashi | |
| 6,596,985 B2 | 7/2003 | Sakai et al. | |
| 6,657,761 B2 | 12/2003 | Suzuki et al. | |
| 6,657,765 B2 | 12/2003 | Hayashi et al. | |
| 6,757,089 B2 | 6/2004 | Hayashi | |
| 6,768,506 B2 | 7/2004 | Hayashi et al. | |
| 6,771,296 B2 | 8/2004 | Hayashi et al. | |
| 6,771,407 B2 | 8/2004 | Hayashi et al. | |
| 6,781,729 B2 | 8/2004 | Suzuki et al. | |
| 6,788,444 B2 | 9/2004 | Suzuki et al. | |
| 6,791,729 B2 | 9/2004 | Atsuumi et al. | |
| 6,803,941 B2 | 10/2004 | Hayashi et al. | |
| 6,813,051 B2 | 11/2004 | Suzuki et al. | |
| 6,829,104 B2 | 12/2004 | Suzuki et al. | |
| 6,833,940 B2 | 12/2004 | Suzuki et al. | |
| 6,882,454 B2* | 4/2005 | Inukai | ........................ 359/204 |
| 6,903,856 B2 | 6/2005 | Hayashi | |
| 6,906,739 B2 | 6/2005 | Suzuki et al. | |

(Continued)

FOREIGN PATENT DOCUMENTS

JP 2004-287292 10/2004

(Continued)

OTHER PUBLICATIONS

U.S. Appl. No. 11/710,907, filed Feb. 27, 2007, Taku Amada, et al.

*Primary Examiner*—Matthew Luu
*Assistant Examiner*—Kendrick X Liu
(74) *Attorney, Agent, or Firm*—Oblon, Spivak, McClelland, Maier & Neustadt, L.L.P.

(57) ABSTRACT

An optical scanning device includes a deflecting unit, a first sensor, and a modulating system. The deflecting unit deflects a plurality of beams in a main scanning direction to a writing area of a surface to be scanned for scanning the writing area. The first sensor detects a beam to be incident on a point on a first side of the writing area, and outputs a signal in response to detected beam. The modulating system modulates the beams in synchronization with the signal output from the first sensor.

11 Claims, 12 Drawing Sheets

U.S. PATENT DOCUMENTS

| | | |
|---|---|---|
| 6,934,061 B2 | 8/2005 | Ono et al. |
| 6,956,685 B2 | 10/2005 | Hayashi |
| 6,987,593 B2 | 1/2006 | Hayashi et al. |
| 6,999,208 B2 | 2/2006 | Suzuki et al. |
| 7,006,120 B2 | 2/2006 | Sakai et al. |
| 7,038,822 B2 | 5/2006 | Sakai et al. |
| 7,045,773 B2 | 5/2006 | Suzuki et al. |
| 7,050,082 B2 | 5/2006 | Suzuki et al. |
| 7,050,210 B2 | 5/2006 | Atsuumi et al. |
| 7,061,658 B2 | 6/2006 | Suzuki |
| 7,068,296 B2 | 6/2006 | Hayashi et al. |
| 7,088,484 B2 | 8/2006 | Hayashi et al. |
| 7,088,485 B2 | 8/2006 | Suzuki |
| 7,106,483 B2 | 9/2006 | Hayashi et al. |
| 7,145,705 B2 | 12/2006 | Hayashi |
| 7,167,288 B2 | 1/2007 | Miyatake et al. |
| 7,218,432 B2 | 5/2007 | Ichii et al. |
| 7,236,281 B2 | 6/2007 | Hayashi et al. |
| 7,253,937 B2 | 8/2007 | Ueda et al. |
| 7,256,815 B2 | 8/2007 | Suzuki et al. |
| 7,271,823 B2 | 9/2007 | Izumi et al. |
| 7,271,824 B2 | 9/2007 | Omori et al. |
| 7,277,212 B2 | 10/2007 | Miyatake et al. |
| 2003/0053156 A1 | 3/2003 | Satoh et al. |
| 2003/0090744 A1* | 5/2003 | Ikeda ......................... 358/474 |
| 2004/0032482 A1* | 2/2004 | Ozasa et al. .................. 347/237 |
| 2004/0032631 A1 | 2/2004 | Amada et al. |
| 2004/0036936 A1 | 2/2004 | Nakajima et al. |
| 2005/0024479 A1 | 2/2005 | Itabashi et al. |
| 2005/0052525 A1* | 3/2005 | Ishibe ........................ 347/235 |
| 2005/0179971 A1 | 8/2005 | Amada et al. |
| 2005/0243396 A1 | 11/2005 | Fujii et al. |
| 2006/0077500 A1 | 4/2006 | Hayashi et al. |
| 2006/0232659 A1 | 10/2006 | Hayashi et al. |
| 2006/0245009 A1 | 11/2006 | Akiyama et al. |
| 2006/0284968 A1 | 12/2006 | Hayashi et al. |
| 2006/0285187 A1* | 12/2006 | Ichii et al. .................... 359/205 |
| 2007/0058255 A1 | 3/2007 | Imai et al. |
| 2007/0211324 A1 | 9/2007 | Sakai et al. |
| 2007/0253048 A1 | 11/2007 | Sakai et al. |
| 2007/0297036 A1 | 12/2007 | Nakamura et al. |

FOREIGN PATENT DOCUMENTS

JP      2005-250319      9/2005

* cited by examiner

FIG. 11

| SURFACE | Rm | Rs | D | N |
|---|---|---|---|---|
| 103a, 104a | PLANE SURFACE | PLANE SURFACE | 4.5 | 1.690 |
| 103b, 104b | −18.5 | −18.5 | | |
| 107a | PLANE SURFACE | 70.85 | 3 | 1.514 |
| 107b | 400 | 400 | | |

FIG. 12

| SURFACE | Rm | Rs | D | N |
|---|---|---|---|---|
| 111a | −312.6 | −312.6 | 31.4 | 1.527 |
| 111b | −83 | −83 | | |
| 112a | −500 | −47.7 | 3.5 | |
| 112b | −1000 | −23.4 | | |

FIG. 13

| | FIRST SCANNING LENS | | SECOND SCANNING LENS | |
|---|---|---|---|---|
| | 111a | 111b | 112a | 112b |
| Rm | -120 | 59.279 | -10000 | 540.625 |
| Rs | -500 | -600 | 521.92 | -40.751 |
| $a_0$ | 2.67 | $1.98 \times 10^{-2}$ | $-7.17 \times 10^{-1}$ | - |
| $a_4$ | $1.98 \times 10^{-2}$ | $2.50 \times 10^{-7}$ | $4.33 \times 10^{-8}$ | - |
| $a_6$ | $-7.17 \times 10^{-1}$ | $9.61 \times 10^{-12}$ | $-5.97 \times 10^{-13}$ | - |
| $a_8$ | - | $-4.54 \times 10^{-15}$ | $-1.28 \times 10^{-16}$ | - |
| $a_{10}$ | $1.79 \times 10^{-7}$ | $-3.03 \times 10^{-18}$ | $5.73 \times 10^{-21}$ | - |
| $b_2$ | $2.50 \times 10^{-7}$ | $1.12 \times 10^{-7}$ | $-7.05 \times 10^{-7}$ | $-2.14 \times 10^{-8}$ |
| $b_4$ | $4.33 \times 10^{-8}$ | $-4.59 \times 10^{-11}$ | $7.85 \times 10^{-11}$ | $-1.63 \times 10^{-14}$ |
| $b_6$ | - | $2.36 \times 10^{-14}$ | $-9.60 \times 10^{-16}$ | - |
| $b_8$ | $-1.08 \times 10^{-12}$ | $-3.00 \times 10^{-17}$ | $-4.32 \times 10^{-19}$ | - |
| $b_{10}$ | $9.61 \times 10^{-12}$ | $-8.43 \times 10^{-22}$ | $2.68 \times 10^{-23}$ | - |
| $b_{12}$ | $-5.79 \times 10^{-13}$ | - | $1.87 \times 10^{-28}$ | - |
| $C_0$ | - | $7.39 \times 10^{-3}$ | - | - |
| $C_2$ | $-3.18 \times 10^{-14}$ | $-7.44 \times 10^{-4}$ | - | $9.79 \times 10^{-7}$ |
| $C_4$ | $4.54 \times 10^{-15}$ | $3.91 \times 10^{-7}$ | - | - |
| $C_8$ | - | $3.12 \times 10^{-14}$ | - | - |
| $C_{10}$ | $3.74 \times 10^{-18}$ | $8.59 \times 10^{-18}$ | - | - |
| $i_0$ | $-3.03 \times 10^{-18}$ | $2.35 \times 10^{-7}$ | - | - |
| $i_2$ | $5.73 \times 10^{-21}$ | $-3.20 \times 10^{-10}$ | - | - |
| $i_4$ | - | $2.49 \times 10^{-14}$ | - | - |
| $i_6$ | $6.59 \times 10^{-7}$ | $6.10 \times 10^{-18}$ | - | - |
| $i_8$ | $1.12 \times 10^{-7}$ | $6.29 \times 10^{-29}$ | - | - |
| $i_{10}$ | $-7.05 \times 10^{-7}$ | $-4.42 \times 10^{-24}$ | - | - |

FIG. 14

| SURFACE | Rm | Rs | D | N |
|---|---|---|---|---|
| 303a | PLANE SURFACE | PLANE SURFACE | 3 | 1.517 |
| 303b | -24.4 | -24.4 | | |
| 307a | PLANE SURFACE | 56 | 3 | |
| 307b | PLANE SURFACE | PLANE SURFACE | | |

FIG. 15

| SURFACE | Rm | Rs | D | N |
|---|---|---|---|---|
| 311a | -120 | -500 | 13.5 | 1.524 |
| 311b | -59.3 | -600 | | |
| 312a | PLANE SURFACE | 521.9 | 13.5 | |
| 312b | 540.6 | -40.8 | | |

FIG. 16

|  | FIRST SCANNING LENS | | SECOND SCANNING LENS | |
| --- | --- | --- | --- | --- |
|  | 311a | 311b | 312a | 312b |
| $a_0$ | – | – | – | – |
| $a_4$ | $8.89 \times 10^{-7}$ | $9.22 \times 10^{-7}$ | $3.29 \times 10^{-7}$ | $1.28 \times 10^{-7}$ |
| $a_6$ | $-2.63 \times 10^{-10}$ | $6.78 \times 10^{-11}$ | $-7.09 \times 10^{-11}$ | $-4.63 \times 10^{-11}$ |
| $a_8$ | $-2.18 \times 10^{-14}$ | $-4.11 \times 10^{-14}$ | $6.27 \times 10^{-15}$ | $4.05 \times 10^{-15}$ |
| $a_{10}$ | $1.37 \times 10^{-17}$ | $-1.37 \times 10^{-17}$ | $-2.73 \times 10^{-19}$ | $-1.66 \times 10^{-19}$ |
| $a_{12}$ | $-3.14 \times 10^{-21}$ | $2.07 \times 10^{-21}$ | $4.74 \times 10^{-24}$ | $2.59 \times 10^{-24}$ |
| $b_1$ | – | $-1.59 \times 10^{-6}$ | $-7.58 \times 10^{-7}$ | – |
| $b_2$ | – | $-4.33 \times 10^{-6}$ | $-1.13 \times 10^{-6}$ | $2.31 \times 10^{-7}$ |
| $b_3$ | – | $4.98 \times 10^{-9}$ | $2.61 \times 10^{-10}$ | – |
| $b_4$ | – | $-2.86 \times 10^{-9}$ | $7.90 \times 10^{-11}$ | – |
| $b_5$ | – | $-2.68 \times 10^{-12}$ | $-5.03 \times 10^{-14}$ | – |
| $b_6$ | – | $2.88 \times 10^{-13}$ | $1.41 \times 10^{-14}$ | – |
| $b_7$ | – | $-1.92 \times 10^{-15}$ | $4.55 \times 10^{-18}$ | – |
| $b_8$ | – | $2.04 \times 10^{-15}$ | $-2.01 \times 10^{-18}$ | – |
| $b_9$ | – | $1.01 \times 10^{-18}$ | $-1.55 \times 10^{-22}$ | – |
| $b_{10}$ | – | $-6.73 \times 10^{-19}$ | $7.49 \times 10^{-26}$ | – |

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document, 2007-042520 filed in Japan on Feb. 22, 2007.

BACKGROUND OF THE INVENTION

1. Field of the Invention

The present invention relates to an optical scanning device and an image forming apparatus.

2. Description of the Related Art

In an image forming apparatus employing the Carlson process, a beam deflected by a deflecting unit such as a polygon mirror scans a surface of a rotating photosensitive drum, so that a static latent image is formed on the surface. The electrostatic latent image is developed into a visible toner image with toner. The toner image is transferred onto a recording medium and fixed thereon. Such image forming apparatuses are often employed for simple printing as an on-demand printing system, and there is an increasing demand for a system that forms (outputs) a high-density image at high speed.

By increasing the rotation rate of the polygon mirror and the photosensitive drum, it is possible to output an image at high speed. However, an increase in rotation rate of the polygon mirror increases noise and vibration from a driving system in addition to power consumption, which decreases the durability of the image forming apparatus. There is a trade-off relationship between increasing of printing speed and image density, and the increase in the rotation rate of the polygon mirror decreases image quality.

To print a high-density image at high speed, Japanese Patent Application Laid-open Nos. 2005-250319 and 2004-287292 disclose a method in which a multibeam light source emitting a plurality of beams is used and the beams scan a surface of a photosensitive drum simultaneously.

However, because the beams emitted from the multibeam light source are incident on a deflecting surface of a deflecting unit at different angles, the beams tend to be shaded on the deflecting surface. To prevent the beams from being shaded, the beams needs to be incident on the deflecting surface at a small angle or the area of a surface to be scanned needs to be limited (i.e., the writing area needs to be small).

SUMMARY OF THE INVENTION

It is an object of the present invention to at least partially solve the problems in the conventional technology.

According to an aspect of the present invention, there is provided an optical scanning device. The optical scanning device includes a deflecting unit that deflects a plurality of beams in a main scanning direction to a writing area of a surface to be scanned for scanning the writing area; a first sensor that detects a beam to be incident on a point on a first side of the writing area, and outputs a signal in response to detected beam; and a modulating system that modulates the beams in synchronization with the signal output from the first sensor.

According to another aspect of the present invention, there is provided an image forming apparatus that includes an optical scanning device including a deflecting unit that deflects a plurality of beams in a main scanning direction to a writing area of a surface to be scanned for scanning the writing area; a first sensor that detects a beam to be incident on a point on a first side of the writing area, and outputs a signal in response to detected beam; and a modulating system that modulates the beams in synchronization with the signal output from the first sensor. The image forming apparatus further includes a photosensitive element having the surface to be scanned on which an electrostatic latent image is formed based on image data; a developing unit that develops the electrostatic latent image into a toner image; a transfer unit that transfers the toner image onto a recording medium; and a fixing unit that fixes the toner image on the recording medium.

According to still another aspect of the present invention, there is provided an image forming apparatus that includes an optical scanning device including a deflecting unit that deflects a plurality of beams in a main scanning direction to a writing area of a surface to be scanned for scanning the writing area; a first sensor that detects a beam to be incident on a point on a first side of the writing area, and outputs a signal in response to detected beam; and a modulating system that modulates the beams in synchronization with the signal output from the first sensor. The image forming apparatus further includes a plurality of photosensitive elements each having the surface to be scanned on which an electrostatic latent image is formed based on image data to obtain electrostatic latent images of different colors; a developing unit that develops the electrostatic latent images into toner images; a transfer unit that transfers the toner images onto a recording medium in a superimposed manner to form a multicolor image; and a fixing unit that fixes the multicolor image on the recording medium.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a table of shapes, center thicknesses, and reflectivities of coupling lenses and a cylindrical lens shown in FIG. 2A;

FIG. 12 is a table of shapes, center thicknesses, and reflectivities of scanning lenses shown in FIG. 2A;

FIG. 13 is a table of example values of coefficients of Equations (1) to (3) according to the first embodiment;

FIG. 14 is a table of shapes, center thicknesses, and reflectivities of a collimating lens and a cylindrical lens shown in FIG. 7;

FIG. 15 is a table of shapes, center thicknesses, and reflectivities of scanning lenses shown in FIG. 7; and FIG. 16 is a table of example values of coefficients of Equations (1) to (3) according to the second embodiment.

DETAILED DESCRIPTION OF THE PREFERRED EMBODIMENTS

Exemplary embodiments of the present invention are explained in detail below with reference to the accompanying drawings.

Figure 1:
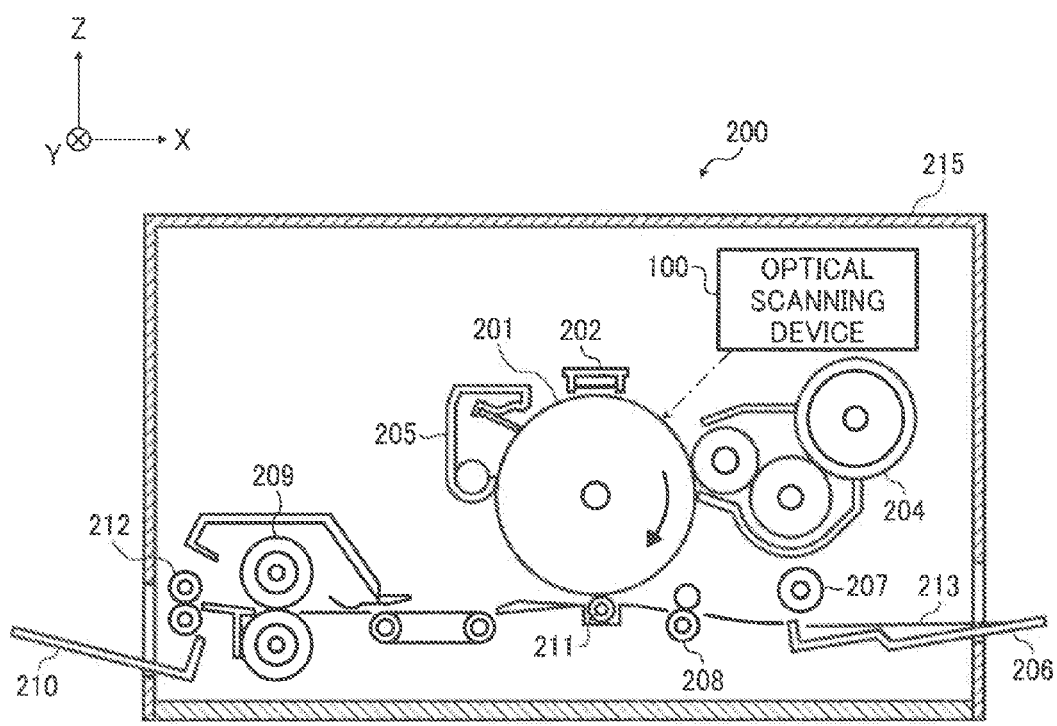
FIG. 1 is a schematic diagram of an image forming apparatus according to a first embodiment of the present invention.

FIG. 1 is a schematic diagram of an image forming apparatus 200 according to a first embodiment of the present invention.

The image forming apparatus 200 is explained as, for example, a printer employing Carlson process in which an image is printed by transferring a toner image onto a recording medium (sheet). The image forming apparatus 200 includes an optical scanning device 100, a photosensitive drum 201, a charger 202, a toner cartridge 204, a cleaner housing 205, a feed tray 206, a sheet feeding roller 207, a pair of registration rollers 208, a transfer charger 211, a fixing roller 209, a pair of ejecting rollers 212, an eject tray 210, and a control unit (not shown) that controls the above units, and a housing 215 that houses therein the above units.

The housing 215 is in a substantially rectangular cubical shape having two side walls, i.e., a +X-side wall and a −X-side wall, on each of which an opening is formed that provides communication between inside and outside the housing 215. Incidentally, side or direction opposite to that indicated by "X" (hereinafter, "+X") in drawings is hereinafter represented by "−X". The −X direction and the +X direction can be collectively referred to as "X direction". The same applies to "Y" and "Z".

The optical scanning device 100 positioned in an upper space in the housing 215 deflects a beam, which is modulated based on image information, in a main scanning direction, so that the beam scans the surface (writing area) of the photosensitive drum 201 and an electrostatic latent image is formed thereon.

The photosensitive drum 201 is cylindrical and includes a photosensitive layer as its surface that, when irradiated with a beam, becomes conductive. The photosensitive drum 201 is positioned below the optical scanning device 100 such that its longitudinal direction extends in a Y direction, and is rotated by a rotating unit (not shown) clockwise as indicated by an arrow shown in FIG. 1. As shown in FIG. 1, the charger 202, the toner cartridge 204, the transfer charger 211, and the cleaner housing 205 are positioned around the photosensitive drum 201.

The charger 202 is positioned above the photosensitive drum 201 with a clearance in between. The charger 202 charges the surface of the photosensitive drum 201 with a predetermined voltage.

The toner cartridge 204 includes a toner container filled with toner, and a developing roller that is charged with a voltage having a polarity opposite to that of the photosensitive drum 201. The toner in the toner container is supplied to the surface of the photosensitive drum 201 via the developing roller.

The cleaner housing 205 includes a rectangle cleaning blade positioned such that its longitudinal direction extends in the Y direction. One end of the cleaning blade is in contact with the surface of the photosensitive drum 201. The toner adhered to the surface of the photosensitive drum 201 is removed by the cleaning blade with rotation of the photosensitive drum 201 and is collected in the cleaner housing 205.

A certain clearance is present between the transfer charger 211 and the surface of the photosensitive drum 201. The transfer charger 211 is charged with a voltage having a polarity opposite to that of the charger 202.

The feed tray 206 is positioned such that one end of the feed tray 206 protrudes out of the housing 215 through the opening on the +X-side wall. The feed tray 206 is capable of holding a plurality of sheets 213 to be fed.

The sheet feeding roller 207 guides the sheets from the feed tray 206 one by one to the clearance between the photosensitive drum 201 and the transfer charger 211 via the registration rollers 208.

The fixing rollers 209 heats and pressurizes each of the sheets 213, and guides it to the ejecting rollers 212.

The ejecting rollers 212 eject the sheets 213 conveyed from the fixing rollers 209 one by one to the eject tray 210, so that the sheets 213 are sequentially stacked on the eject tray 210. One end of the eject tray 210 protrudes out of the housing 215 through the opening on the −X-side wall.

Figure 2A:
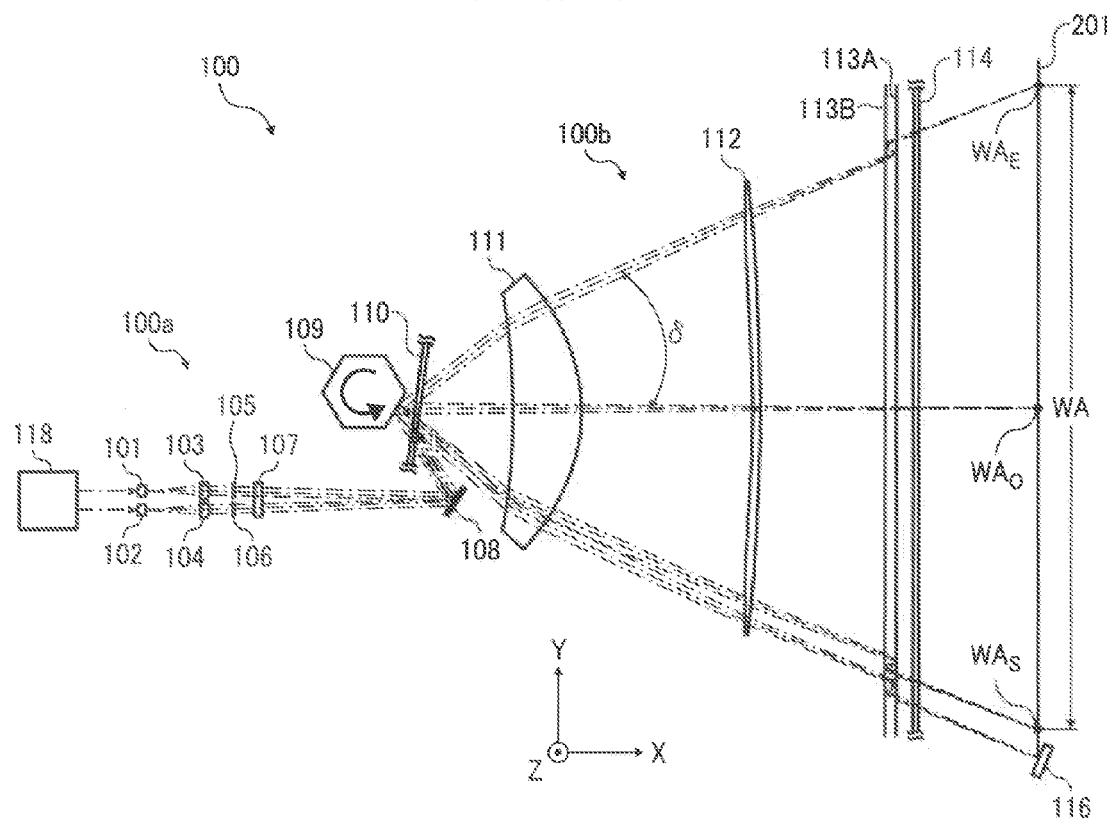
FIGS. 2A and 2B are schematic diagrams of an optical scanning device shown in FIG. 1.
Figure 2B:
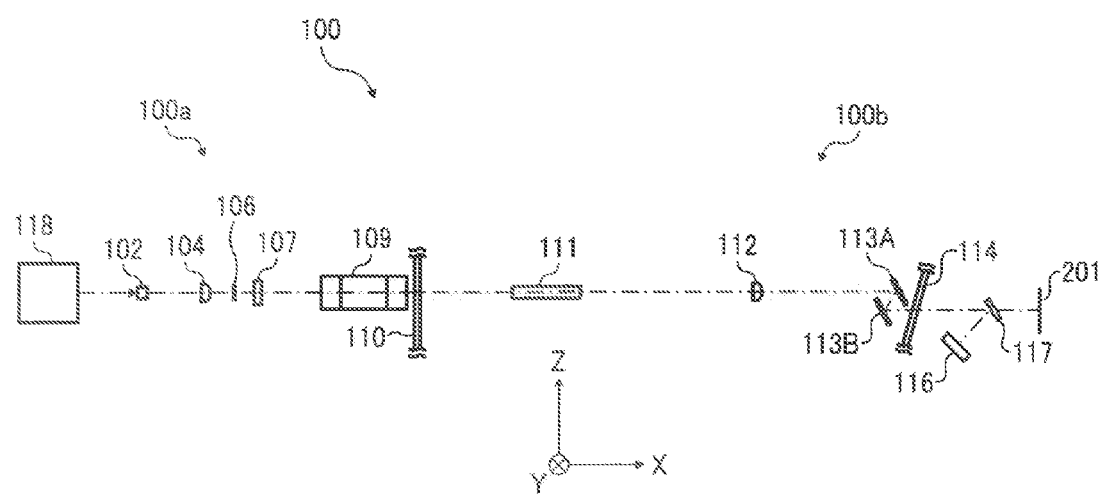

FIG. 2A is an overhead view of the optical scanning device 100 (viewed from a +Z side). FIG. 2B is a side view of the optical scanning device 100 (viewed from a −Y side). As shown in FIGS. 2A and 2B, the optical scanning device 100 includes a pair of light sources 101 and 102, a first optical system 100a, a polygon mirror 109, a second optical system 100b, a photodetector 116, and a light source driving unit 118.

The light source driving unit 118 drives the light sources 101 and 102 under the control of a main control unit (not shown).

Each of the light sources 101 and 102 is a semiconductor laser emitting a beam with a wavelength of, for example, about 655 nanometers from the center thereof. The light sources 101 and 102 are slightly oblique to the X axis (by 2 degrees in the embodiment) such that the beams emitted from the light sources 101 and 102 intersect near the deflecting surface of the polygon mirror 109 that deflects the beams.

The first optical system 100a includes coupling lenses 103 and 104, a pair of apertures 105 and 106, a cylindrical lens 107, and a reflecting mirror 108. The beam emitted from light source 101 passes through the coupling lens 103 and the apertures 105. The beam emitted from the light source 102 passes through the coupling lens 104 and the aperture 106. Thereafter, both of the beams pass through the cylindrical lens 107 and are reflected by the reflecting mirror 108 to the polygon mirror 109.

The coupling lenses 103 and 104 positioned on the +X side with respect to the light sources 101 and 102 substantially collimate the beams emitted from the light sources 101 and 102.

The apertures 105 and 106 are 10 millimeters distant from the coupling lenses 103 and the 104 in the +X direction. The apertures 105 and 106 limit the diameter of beam spots of the beams (spot size) collimated by the coupling lenses 103 and 104 to obtain beam spots of desired shape.

The cylindrical lens 107 is 9.9 millimeters distant from the apertures 105 and 106 in the +X direction. The cylindrical lens 107 is, for example, an anamorphic lens having a first surface (an incident surface 107a) on which a beam is deflected in a Z direction (sub scanning direction), and a second surface (an emitting surface 107b) on which the beam is deflected in the Y direction (main scanning direction). The cylindrical lens 107 focuses the beams having passed through the apertures 105 and 106 near the deflecting surface of the polygon mirror 109 in the sub scanning direction.

FIG. 11 is a table of center thicknesses D of the coupling lenses 103 and 104 and the cylindrical lens 107, reflectivities N of an incident surface 103a and an emitting surface 103b from which a beam is emitted, an incident surface 104a and an emitting surface 104b of the coupling lens 104, and the incident surface 107a and the emitting surface 107b of the cylindrical lens 107, radii of paraxial curvature Rm of the coupling lenses 103 and 104 and the cylindrical lens 107 in the main scanning direction, and radii of paraxial curvature Rs of the coupling lenses 103 and 104 and the cylindrical lens 107 in the sub scanning direction.

The polygon mirror 109 is a hexagonal column having a top surface and a bottom surface each inscribing a circle with a diameter of 18 millimeters. The polygon mirror 109 has six side surfaces each serving as a deflecting surface, and rotates on an axis parallel to the Z-axis as shown in FIG. 2A at a constant angular speed, so that the beam incident on the surface of the polygon mirror 109 is deflected in the Y direction. Such a beam is referred to as "scanning light" for convenience of description. It is assumed herein that an angle θ of the deflecting surface perpendicular to the X direction is a reference angle (0 degree), the angle θ in the clockwise direction is represented as +θ, and the angle θ in the counterclockwise direction is represented as −θ. For example, when the beam is incident on a writing area WA shown in FIG. 2 on the +Y side, the angle θ is represented as +θ. When the beam is incident on the writing area WA on a −Y side, the angle θ is represented as −θ.

The second optical system 100b includes the first scanning lens 111, the second scanning lens 112, and a pair of turning mirrors 113A and 113B.

The first scanning lens 111 is an fθ lens having an incident surface 111a and 68.3 millimeters distant from a rotation axis of the polygon mirror 109 in the +X direction.

The second scanning lens 112 is a toroidal lens with a surface on which a beam is deflected in the sub scanning direction. An incident surface 112a of the second scanning lens 112 is 78 millimeters distant from an emitting surface 111b of the first scanning lens 111. The optical distance between an emitting surface 112b of the second scanning lens 112 and the surface of the photosensitive drum 201 is 142.4 millimeters.

FIG. 12 is a table of center thicknesses D of the first and second scanning lenses 111 and 112, reflectivities N of the incident surface 111a, the emitting surface 111b, the incident surface 112a, and the emitting surface 112b, radii of paraxial curvature Rm of the first and second scanning lenses 111 and 112 in the main scanning direction, and radii of paraxial curvature Rn of the first and second scanning lenses 111 and 112 in the sub scanning direction.

Shapes of the incident surfaces 111a and 112a and the emitting surfaces 111b and 112b can be represented by functions represented by the following Equations (1) to (3):

[Equation 1]
$$X(Y) = \frac{\frac{Y^2}{R_m}}{1+\sqrt{1-(1+a_{00})\cdot\left(\frac{Y}{R_m}\right)^2}} + a_4 \cdot Y^4 + a_6 \cdot Y^6 + \ldots + \frac{C_s(Y)^2 \cdot Z^2}{1+\sqrt{1-(1+Kz(Y))\cdot C_s(Y)^2 \cdot Z^2}} + (i_0 + i_2 \cdot Y^2 + i_4 \cdot Y^4 + \ldots)\cdot Z^4 \quad (1)$$

[Equation 2]
$$Cs(Y) = \frac{1}{R_S} + b_2 \cdot Y^2 + b_4 \cdot Y^4 + \ldots \quad (2)$$

[Equation 3]
$$Kz(Y) = C_0 + C_2 \cdot Y^2 + c_4 \cdot Y^4 + \quad (3)$$

where Y and Z are coordinates with respect to the position of an optical axis as an origin in the main scanning direction and the sub scanning direction. FIG. 13 is a table of example values of coefficients $a_n$, $b_n$, $C_n$, and $i_n$.

The beam deflected by the polygon mirror 109 enters the photodetector 116 before incident on the writing area of the photosensitive drum 201 (i.e., the surface of the photosensitive drum 201 to be scanned). Thereafter, the photodetector 116 outputs an electronic signal corresponding to an intensity of the beam. In FIG. 2A, the photodetector 116 is positioned on the −Y side of the writing area WA. However, the position of the photodetector 116 is not limited to this. It suffices that a scanning light is incident on the photodetector 116 via, for example, a reflecting mirror 117 before incident on the writing are WA. Alternatively, a scanning light can be focused on the photodetector 116 via, for example, an anamorphic lens before incident on the writing area WA.

The optical scanning device 100 further includes a soundproof glass 110 and a dustproof glass 114 that are positioned above the optical path of beams. The dustproof glass 114 is a part of the chassis of the optical scanning device 100. Angles of the soundproof glass 110 and the dustproof glass 114 with respect to the scanning light are adjusted to prevent image degradation due to a ghost light of the scanning light guided to the electrostatic latent image formed on the photosensitive drum 201 and prevent the scanning light from being reflected from the soundproof glass 110 and the dustproof glass 114 to an area near the light sources 101 and 102. Specifically, the soundproof glass 110 is oblique to the main scanning direction by 8 degrees and the dustproof glass 114 is oblique to the sub scanning direction by 17 degrees.

Operations of the image forming apparatus 200 are explained below. Once the main control unit receives image information from an upper device, the light source driving unit 118 is driven based on modulation data obtained from the image information, so that the light sources 101 and 102 emit beams modulated based on the image information. The beams are substantially collimated by the coupling lenses 103 and 104, and enter the apertures 105 and 106 to be adjusted in spot shape. After passing through the cylindrical lens 107, the beams are reflected by the reflecting mirror 108 and converged on the deflecting surface of the polygon mirror 109.

The beams propagating along the optical axis of the light sources 101 and 102 are incident on the deflecting surface of the polygon mirror 109 at an incident angle of 60 degrees (i.e., angle of 60 degrees with respect to the X axis). Given that a point in the writing area, at which the line perpendicular to the surface of the photosensitive drum 201 and extending from a point on the deflecting surface of the polygon mirror 109 having an angle of −30 degrees with respect to the X axis intersects the surface, is a reference point O in the writing area (i.e., a point where an image height is 0), the writing area WA extends from a writing start point $WA_S$ 148.5 millimeters distant from the reference point O in the +Y direction to a writing end point $WA_E$ 148.5 millimeters distant from the reference point O in the −Y direction.

A half angle of view δ of the polygon mirror 109 with respect to the writing area WA is 38.7 degrees. In synchronization with a signal sent from the photodetector 116, modulation of a beam (scanning light) is started when the beam spot reaches the writing start point $WA_S$, and the modulation of the beam is stopped when the beam spot reaches the writing end point $WA_E$. The timing when the light source driving unit 118 starts modulating beams is explained below.

As explained above, the beams emitted from the light sources 101 and 102 are incident on the polygon mirror 109 at different angles with respect to the main scanning direction. Specifically, the beams emitted from the light sources 101 and 102 are incident on the deflecting surface having an angle of −30 degrees with respect to the X axis at 28.32 degrees and 31.74 degrees, respectively. Thereafter, a scanning light (beam) emitted from the light source 102 and incident on the deflecting surface at a larger angle (hereinafter, "leading scanning light") enters the photodetector 116, a scanning light emitted from the light source 101 and incident on the deflecting surface at a smaller angle (hereinafter, "following scanning light") enters the photodetector 116.

After a time T1 has passed from the time when the main control unit detects the signal emitted from the photodetector 116, the main control unit starts modulating a beam at the light source 102 via the light source driving unit 118, so that the leading scanning light scans the writing area WA. After a time T2 has passed from the time when the leading scanning light starts scanning the writing area WA, the main control unit starts modulating a beam at the light source 101 via the light source driving unit 118, so that the following scanning light scans the writing area WA. The leading scanning light and the following scanning light are adjusted by the first and second scanning lenses 111 and 112 with respect to the speed of scanning by the beam spots in the main scanning direction. Thereafter, the scanning lights are reflected by the turning mirrors 113A and 113B and are focused on the surface of the photosensitive drum 201. In this manner, the surface of the photosensitive drum 201 is scanned. The times T1 and T2 are delay times determined by positions of the light sources 101 and 102 and scanning speeds.

The surface of the photosensitive drum 201 is uniformly charged to a predetermined voltage by the charger 202. After the surface of the photosensitive drum 201 is scanned by the leading scanning light and the following scanning light, the photosensitive layer (surface) of the photosensitive drum 201 becomes conductive and charge transfer occurs in the photosensitive layer, and thus, the electric potential is reduced. As a result, an electrostatic latent image determined by the charge distribution is formed on the surface of the photosensitive drum 201.

Thereafter, the toner is supplied to the surface of the photosensitive drum 201 by the developing roller of the toner cartridge 204. Because the developing roller is charged to the polarity opposite to that of the photosensitive drum 201, the toner adhered to the developing roller is charged to the polarity opposite to that of the photosensitive drum 201 as well. Therefore, the toner is adhered only to the scanned portions and is not adhered to the charged portions of the surface of the photosensitive drum 201, and a toner image based on the electrostatic latent image is formed. The toner image is transferred onto the sheet 213 by the transfer charger 211 and is fixed by the fixing rollers 209, so that an image is formed on the sheet 213. The sheet 213 is ejected by the ejecting rollers 212 to the eject tray 210.

As explained above, the photodetector 116 receives the following scanning light and outputs a signal based on the following scanning light. In synchronization with the signal, the writing area WA of the photosensitive drum 201 is scanned by the leading scanning light and the following scanning light.

Figure 3A:
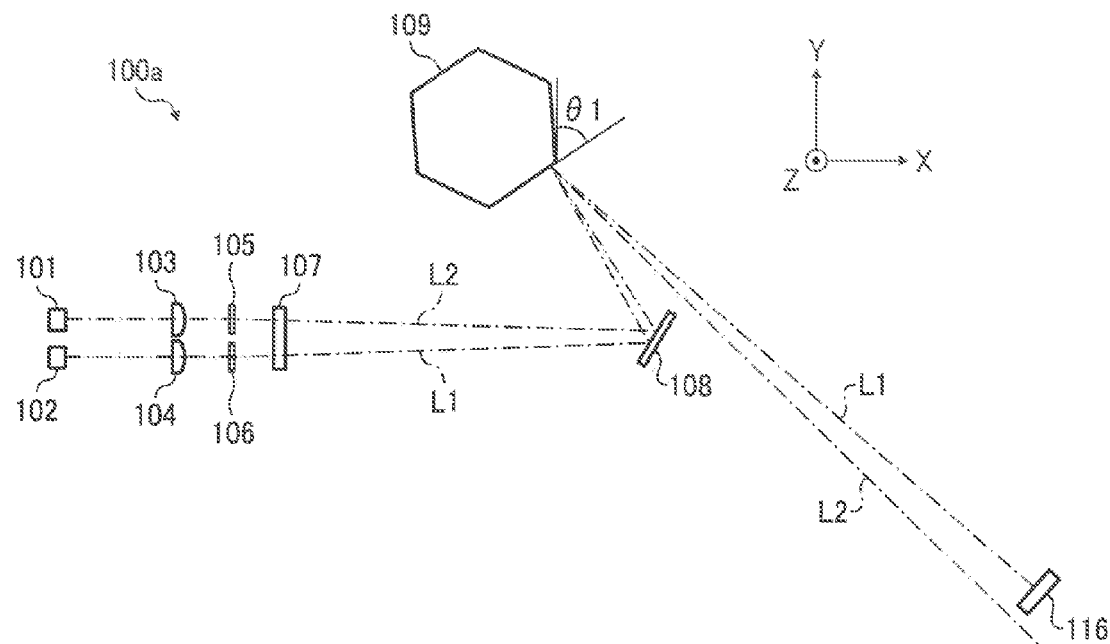
FIGS. 3A and 3B are schematic diagrams of the optical scanning device for explaining how a scanning light is incident on a photodetector.
Figure 3B:
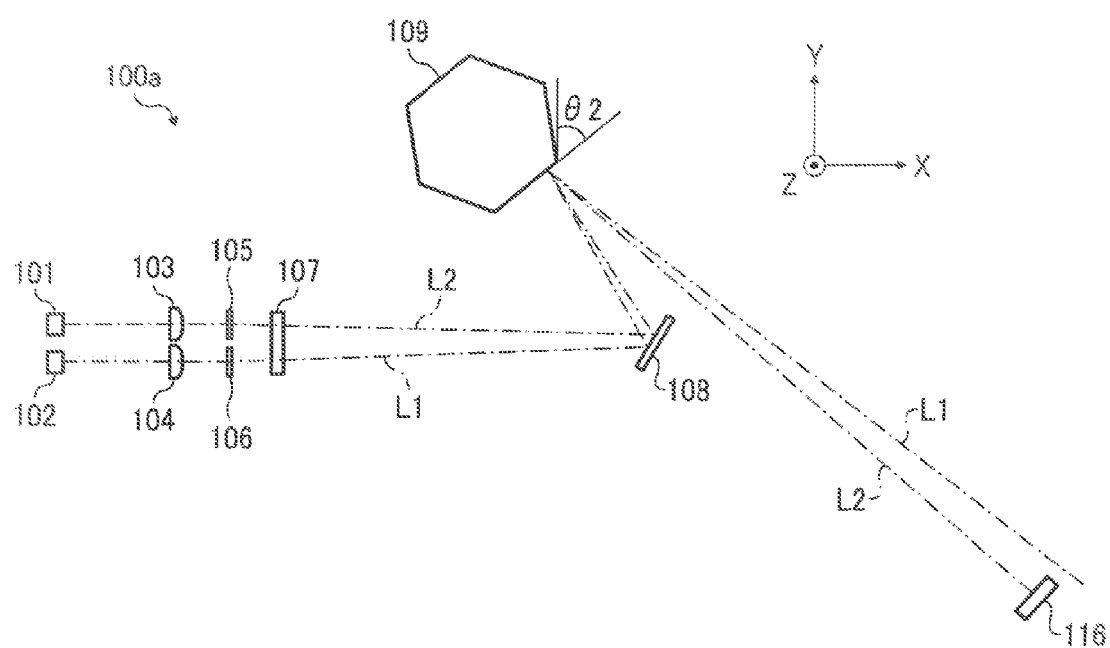

FIGS. 3A and 3B are schematic diagrams of the optical scanning device 100. The second optical system 100*b* is not shown in FIGS. 3A and 3B for simple explanation although a leading scanning light L1 and a following scanning light L2 shown in FIGS. 3A and 3B are incident on the photodetector 116 via the second optical system 100*b*.

As shown in FIG. 3A, an angle of −θ1 of the deflecting surface of the polygon mirror 109 when the leading scanning light L1 is incident on the photodetector 116 is larger than an angle of −θ2 of the deflecting surface of the polygon mirror 109 when the following scanning light L2 is incident on the photodetector 116. This represents that the leading and following scanning lights L1 and L2 are incident on the deflecting surface of the polygon mirror 109 near its edge in the case where the leading scanning light L1 is incident on the photodetector 116 (hereinafter "case A") as shown in FIG. 3A.

On the other hand, in the case where the following scanning light L2 is incident on the photodetector 116 as shown in FIG. 3B (hereinafter, "case B"), the leading and following scanning lights L1 and L2 are incident on a point on the deflecting surface of the polygon mirror 109, which is close to the center of the deflecting surface compared with the case A. In other words, the leading and following scanning lights L1 and L2 in the state B are less susceptible to shading on the deflecting surface.

As described above, according to the first embodiment, because the photodetector 116 outputs a signal upon receiving the following scanning light L2, and modulation of scanning light is started based on the signal. Thus, a large angle of incidence can be secured to prevent shading. Furthermore, the large angle of incidence shortens the optical path of scanning light in the second optical system 100*b*, which leads to downsizing of the optical scanning device 100.

The writing area (the surface of the photosensitive drum 201) that is scanned by the leading scanning light L1 without shading is in a range from −167.1 millimeters to +166.0 millimeters with respect to the reference point O, and the writing area scanned by the leading scanning light L2 without shading is within a range from −160.8 millimeters to +172.1 millimeters with respect to the reference point O. For this reason, the photodetector 116 is positioned such that the following scanning light L2, which is incident on a point on the writing area −161 millimeters distant from the reference point O, is guided to the photodetector 116.

Because the optical scanning device 100 can be downsized, the image forming apparatus 200 including the optical scanning device can be downsized as well.

In the first embodiment, the beams emitted from the light sources 101 and 102 intersect near the deflecting surface of the polygon mirror 109. Alternatively, the beams can intersect on the deflecting surface having an angle of −30 degrees with respect to the X axis.

In addition to the photodetector 116 positioned on the −Y side of the writing area WA, a photodetector can be additionally arranged on the +Y side of the writing area WA. By detecting the leading and following scanning lights L1 and L2 on both of the −Y and +Y sides, it is possible to detect, in real time, variation in magnification of the first and second optical systems 100a and 100b. Therefore, even if change in relative position, physical variation, or mechanical tolerance is caused between the light sources 101 and 102, the influence of the above errors (change) can be eliminated by adjusting the timing of modulating each beam based on the result of detecting the leading and following scanning lights L1 and L2. This makes it possible to scan the writing area WA with accuracy.

In this case, because the photodetector on the +Y side of the writing area WA receives a leading scanning light emitted from the light source 102 as a signal and uses the signal as a synchronization signal, the variation in magnification can be detected preferably even if a following optical light is shaded.

In the first embodiment, each of the light sources 101 and 102 emits one beam. Instead of the light sources 101 and 102, light sources 101A and 102A shown in FIG. 4 each including a plurality of light-emitting points can be used.

The light source 101A includes a pair of light-emitting points 101a and 101b positioned with a distance d1 in between, and the light source 102A includes a pair of light-emitting points 102a and 102b positioned with the distance d1 in between.

Figure 4:
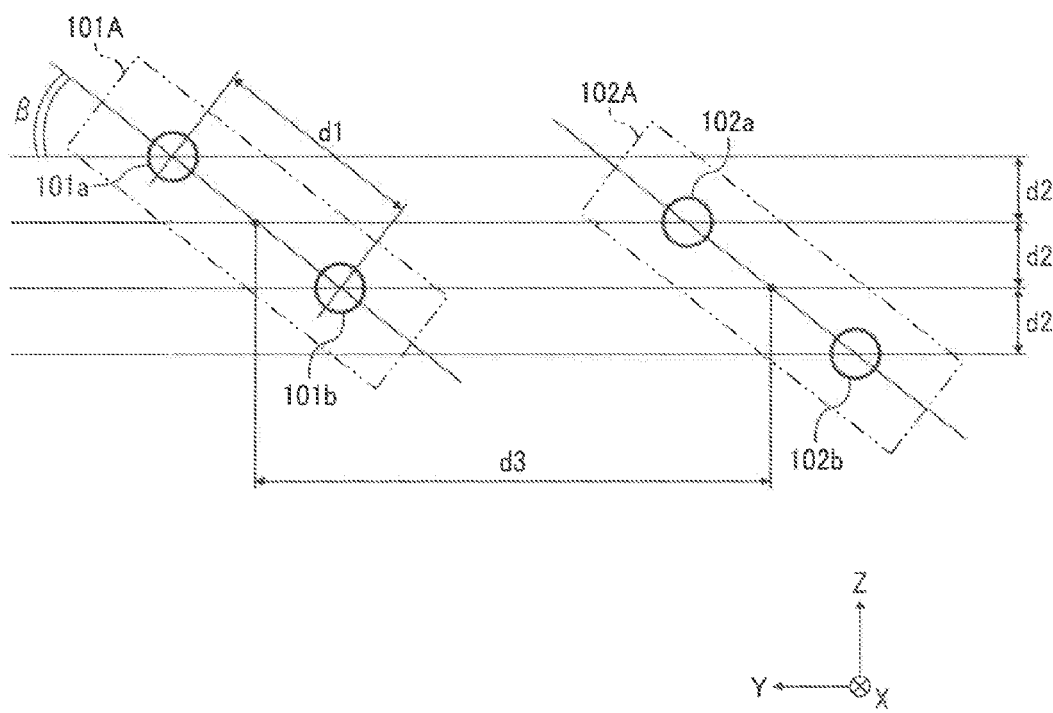
FIG. 4 is a schematic diagram of a modified example of light sources shown in FIG. 2A.

As shown in FIG. 4, the light sources 101A and 102A are rotated by β degrees on a rotation axis parallel to the X axis and positioned such that the distance between the centers of the light sources 101A and 102A is d3 in the Y direction and the distances d2 between the light-emitting points 101a, 101b, 102a, and 102b in the Z direction are each d2. Specifically, d1 is 30 micrometers, d2 is 4.18 micrometers, d3 is 11.52 millimeters, and β is 75.5 degrees.

Beams emitted from the respective light-emitting points 101a, 101b, 102a, and 102b are all deflected by the polygon mirror 109. Accordingly, the four beams scan the writing area of the photosensitive drum 201 and writes four lines with intervals of, for example, 42.3 micrometers corresponding to the pixel density of 600 dot per inch (dpi). The beam emitted from the light-emitting point 101a scans the writing area within a range from −168.3 millimeters to +160.8 millimeters in the main scanning direction with respect to the reference point O. The beam emitted from the light-emitting point 101b scans the writing area within a range from −168.5 millimeters to +166.5 millimeters in the main scanning direction with respect to the reference point O. The beam emitted from the light-emitting point 102a scans a writing area within a range from −168.3 millimeters to +167.7 millimeters in the main scanning direction with respect to the reference point O. The beam emitted from the light-emitting point 102b scans a writing area within a range from −168.4 millimeters to +167.5 millimeters in the main scanning direction with respect to the reference point O. The photodetector 116 is positioned to sequentially receive beams emitted from the light-emitting points 102b, 102a, 101a, and 101b, which are to be incident on the photosensitive drum 201 at a point 161 millimeters distant from the reference point O in the −Y direction.

The main control unit starts modulating beams emitted from the light-emitting points 101a and 101b via the light source driving unit 118 in synchronization with a signal based on a beam emitted from the light-emitting point 101a (following scanning light), and starts modulating beams emitted from the light-emitting points 102a and 102b via the light source driving unit 118 in synchronization with a signal based on a beam emitted from the light-emitting point 102a (following scanning light). With this, the angle of incidence of the optical scanning device can be large, which leads to downsizing of the optical scanning device.

Figure 5A:
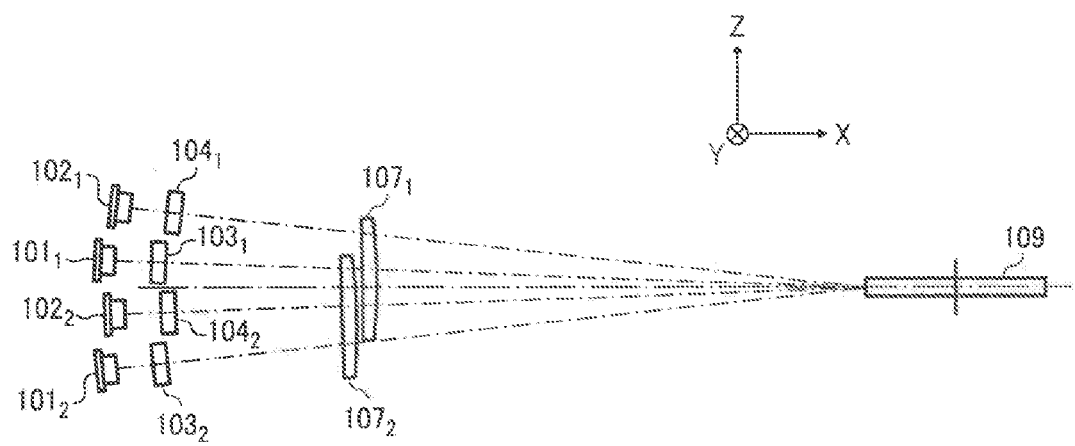
FIGS. 5A and 5B are schematic diagrams for explaining another modified example of the light sources shown in FIG. 2A.
Figure 5B:
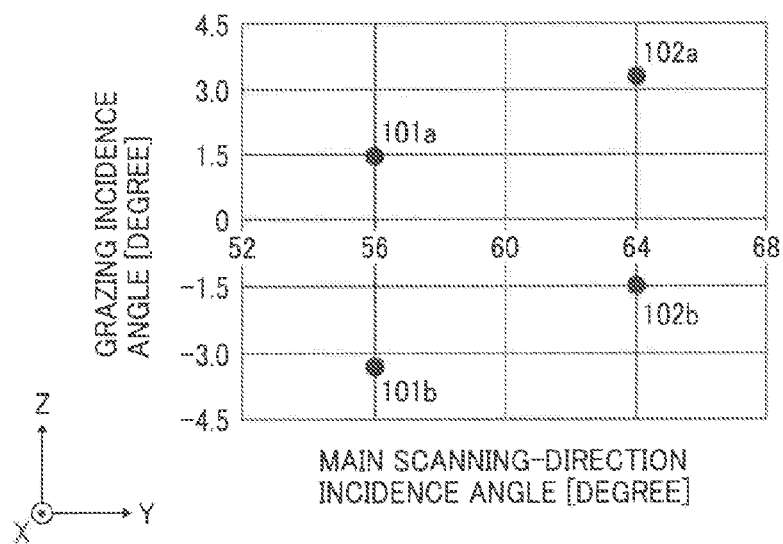

Instead of the light sources 101A and 102A, four light sources $101_1$, $101_2$, $102_1$, and $102_2$ respectively including the light-emitting points 101a, 101b, 102a, and 102b can be employed. The light sources $101_1$, $101_2$, $102_1$, and $102_2$ can be arranged, as shown in FIG. 5B, in positions that correspond to vertices of a parallelogram. Beams emitted from the light-emitting points 101a, 101b, 102a, and 102b intersect near the deflecting surface of the polygon mirror 109 and then are incident on the deflecting surface of the polygon mirror 109. The beams emitted from the light-emitting points 101a and 101b scan the writing area on the surface of the photosensitive drum 201 in a range from −167.1 millimeters to +166.0 millimeters in the main scanning direction with respect to the reference point O. The beams emitted from the light-emitting points 102a and 102b scan the writing area in a range from −160.8 millimeters to +172.1 millimeters in the main scanning direction with respect to the reference point O. Beams from the light-emitting points 101a, 101b, 102a, and 102b are modulated based on the following scanning light emitted from the light-emitting points 101a and 101b.

Figure 6:
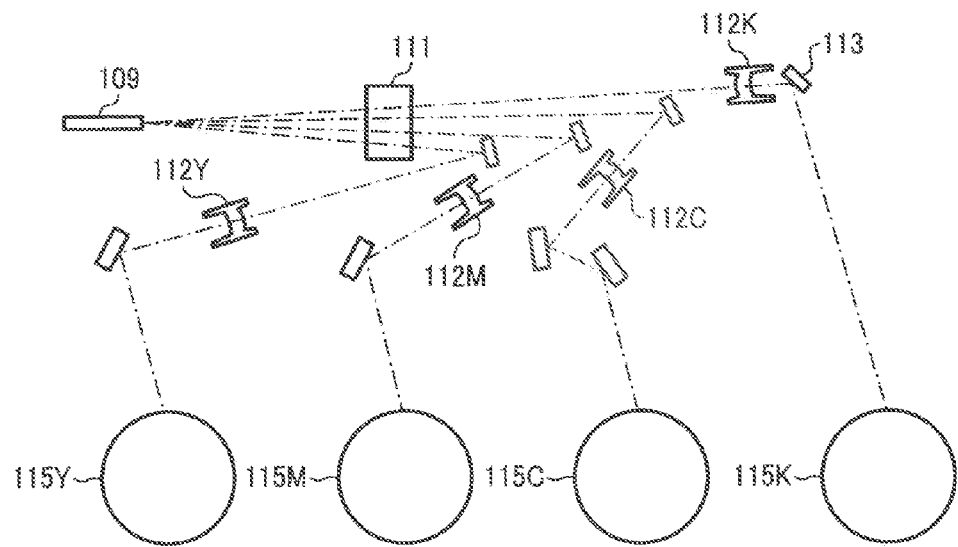
FIG. 6 is a schematic diagram of a full-color image forming apparatus that includes the optical scanning device shown in FIG. 2A.

With this type of optical scanning device, a tandem full color image forming apparatus shown in FIG. 6 can be obtained. In the tandem full color image forming apparatus, as shown in FIG. 6, the beams emitted from the light sources $101_1$, $101_2$, $102_1$, and $102_2$ are respectively reflected by reflecting mirrors 113 and guided to the photosensitive drums 115Y, 115M, 115C, and 115K.

Also in this case, a photodetector can be additionally arranged on the +Y side of the writing area, so that the following scanning light from the light sources $101_1$, $101_2$, $102_1$, and $102_2$ is detected on both the −Y and +Y sides. With this, even if variation in temperature, change in relative position, physical variation, or mechanical tolerance is caused between the light sources $101_1$, $101_2$, $102_1$, and $102_2$, it is possible to eliminate the cause of errors (change) and scan the writing area with accuracy.

Figure 7:
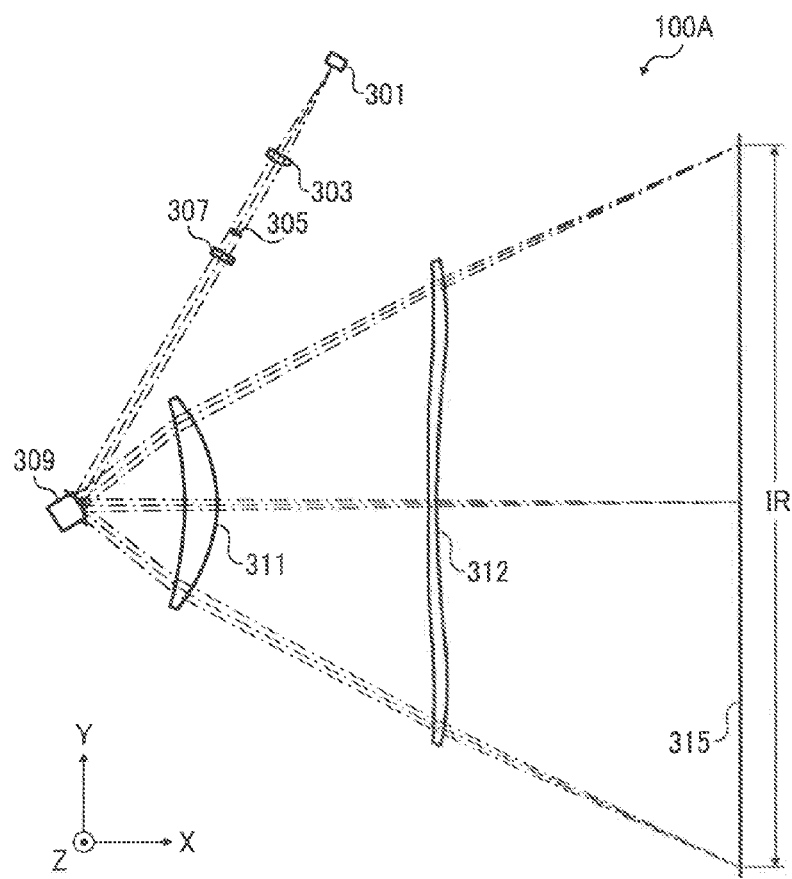
FIG. 7 is an overhead view of an optical scanning device according to a second embodiment of the present invention.

FIG. 7 is an overhead view of an optical scanning device 100A according to a second embodiment of the present invention. The optical scanning device 100A is of basically the same configuration as the optical scanning device 100, and the same explanation is not repeated. The optical scanning device 100A includes a light source 301 including a plurality of light-emitting points two-dimensionally arranged. Beams emitted from the light-emitting points are substantially collimated by a collimating lens 303 having a focal length of 46.5 millimeters, and the spot size is limited by an aperture 305. Thereafter, the beams pass through a cylindrical lens 307 having a focal length of 126.8 millimeters for forming a long linear image in the main scanning direction. The cylindrical lens 307 focuses the beams near a deflecting surface of a polygon mirror 309 in the sub scanning direction. The beams deflected by the polygon mirror 309 passes through scanning lenses 311 and 312 and are converged on a surface (writing area) of a photosensitive element 315. The aperture 305 is 47.7 millimeters distant from an emitting surface of the collimating lens 303 and is 10.3 millimeters distant from an incident surface of the cylindrical lens 307.

The collimating lens 303 and the cylindrical lens 307 can be made of glass. Alternatively, resin can be used for cost reduction. For example, if resin is used for those lenses, a diffractive-optical element can be adopted to reduce degradation of optical performance due to change in temperature. The collimating lens 303 has a first surface (incident surface 303a) and a second surface (emitting surface 303b), and the cylindrical lens 307 has a first surface (incident surface 307a)

and a second surface (emitting surface 307b). FIG. 14 is a table of center thicknesses D of the collimating lens 303 and the cylindrical lens 307, reflectivities N of the incident surfaces 303a and 307a and the emitting surfaces 303a and 307b at a wavelength of 780 nanometers, radii of paraxial curvature Rm of the collimating lenses 303 and the cylindrical lens 307 in the main scanning direction, and radii of paraxial curvature Rs of the collimating lenses 303 and the cylindrical lens 307 in the sub scanning direction.

The scanning lenses 311 and 312 are fθ lenses that adjust the beams such that beam spots having a uniform diameter scan the surface of the photosensitive element 315 at a constant speed. The scanning lens 311 has a first surface (incident surface) 311a and a second surface (emitting surface) 311b, and the scanning lens 312 has a first surface 312a and a second surface 312b. The first surface 311a is 46.3 millimeters distant from the rotation axis of the polygon mirror 309. The second surface 311b is 89.7 millimeters distant from the first surface 312a, and the second surface 312b is 141.4 millimeters distant from the surface of the photosensitive element 315.

FIG. 15 is a table of designing data (shapes, center thicknesses, and reflectivities at a wavelength of 780 nanometers) of the scanning lenses 311 and 312. The shapes of the first surfaces 311a and 312a and the second surfaces 311b and 312b of the scanning lenses 311 and 312 can be represented by the above Equations (1) to (3). FIG. 16 is a table of values of coefficients $a_n$ and $b_n$ of Equations (1) to (3) according to the second embodiment.

A beam emitted from the center of the light source 301 is incident on a reflecting point on the polygon mirror 309 having a rotation angle of 30 degrees at an angle of incidence of 60 degrees. Given that a point, to which the line perpendicular to the surface of the photosensitive element 315 extends from the reflecting point on the polygon mirror 309, is a reference point O (i.e., a point where an image height is 0), an effective writing area IR shown in FIG. 7 is within a range from −150.0 millimeters to +150.0 millimeters in the Y direction with respect to the reference point O.

A half angle of view of the polygon mirror 309 with respect to the effective writing area IR is 35.9 degrees. While the effective writing area IR is scanned, a beam emitted from the light source (semiconductor laser) is modulated and the surface of the photosensitive element 315 is scanned by the beam, so that an electrostatic latent image is formed on the surface. A photodetector (not shown) is in a position 161 millimeters distant in the −Y direction from the reference point O. The light source 301 is caused to emit light such that a beam enters the photodetector when a point 161 millimeters distant in the −Y direction from the reference point O is scanned by the beam. The beam is detected as a synchronization signal by the photodetector, and the signal is sent to a light source driving circuit as a horizontal synchronizing signal. Based on the horizontal synchronizing signal and image information, a beam emitted from the light source is modulated. This leads to the accurate scanning of the effective writing area IR. The polygon mirror 309 is a hexagonal column having a top surface and a bottom surface each inscribing a circle with a radius of 7 millimeters, and has a reference rotation angle of 30 degrees with respect to the surface of the photosensitive element 315.

Figure 8:
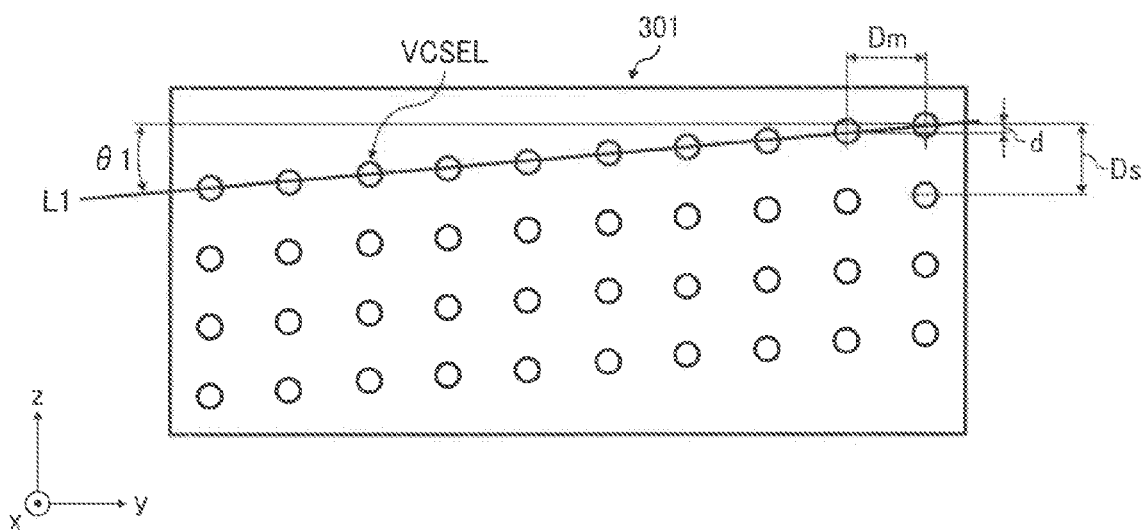
FIG. 8 is a schematic diagram of a light source including a plurality of light-emitting points.

FIG. 8 is a schematic diagram of the light source 301 including a two-dimensional array of 40 light-emitting points. The light source 301 is capable of emitting a plurality of light beams with a single element, and can be realized by a vertical cavity surface emitting laser (VCSEL) in which influence of the temperature on an oscillation wavelength is small, and, basically, random variation in the wavelength (mode hopping) is not caused. In other words, the optical performance does not degrade depending on the environmental change. The VCSEL has an oscillation wavelength of 780 nanometers, a full width at half maximum (FWHM) in the main and sub scanning directions within a range of plus and minus 1 degree of 7 degrees, and a near field pattern of 4 micrometers.

The light-emitting points of the VCSEL are arranged such that a distance between light-emitting points which are the farthest from each other in the sub scanning direction is smaller than a distance between light-emitting points the farthest from each other in the main scanning direction (i.e., the light-emitting points are positioned in a parallelogram having a length in the main scanning direction). This means that more light-emitting points are arranged in the main scanning direction than those arranged in the sub scanning direction. Adjacent light-emitting points are required to be spaced apart wide enough in consideration of wiring and preventing heat generation. When a distance d shown in FIG. 8 in the sub scanning direction between adjacent light-emitting points is represented by $1 \leq d \leq 4$ (micrometers), a distance Dm shown in FIG. 8 between adjacent light-emitting points in the main scanning direction can be larger than the distance d. A light source including a plurality of light-emitting points arranged in a matrix can also be used by arranging the light source to be oblique by a predetermined angle.

According to the second embodiment, the distance Dm is 30 micrometers, the distance Ds is 20 millimeters, the distance d is 2.0 micrometers (480 dpi). In the light source, 10 light-emitting points are arranged in each line in the main scanning direction. The distance between the light-emitting points the farthest from each other in the main scanning direction is 270 micrometers (=Dm×9), and the distance between the light-emitting points the farthest from each other in the sub scanning direction is 78 micrometers (=d×39). To perform high-density scanning, it is preferable that the light-emitting points be concentrated in the sub scanning direction. Furthermore, to improve the performance, efficiency, and durability of the optical scanning device, it is preferable that the sides in the main scanning direction of an arrangement area in which the light-emitting points are arranged be longer than those in the sub scanning direction of the arrangement area. If light-emitting points are arranged in an area having the sides in the sub scanning direction, which are longer than those in the main scanning direction, degradation of the optical performance due to change in temperature increases. The temperature change causes distension of the scanning lens and variation in reflectivity, which causes displacement of dots (beam spots) in the sub scanning direction. Such displacement is more apparent in a position distant from the optical axis of the optical system in the sub scanning direction.

The variation in scanning-line intervals due to temperature can be seen the most apparently between the light-emitting points the farthest from each other. This is because, due to variation in lateral magnification, a scanning line formed by beams emitted from the light-emitting points on the −Z side and a scanning line formed by beams emitted from the light-emitting points on the +Z side deviates in the opposite directions from the optical axis in the sub scanning direction (Z direction). An error in scanning-line intervals that occurs when adjacent scanning lines deviate in the opposite directions is large, and causes displacement of dots in the sub scanning direction. Such displacement is recognized as banding that appears upon each scanning and causes quality degradation of an image. If a scanning lens made of resin is employed for cost reduction, variation in thermal expansion and reflectivity is large compared with the case where a lens made of glass is employed, which accelerates the degradation of image quality. Therefore, it is preferable that the sides of the arrangement area in the sub scanning direction be 100 micrometers or less.

Figure 9:
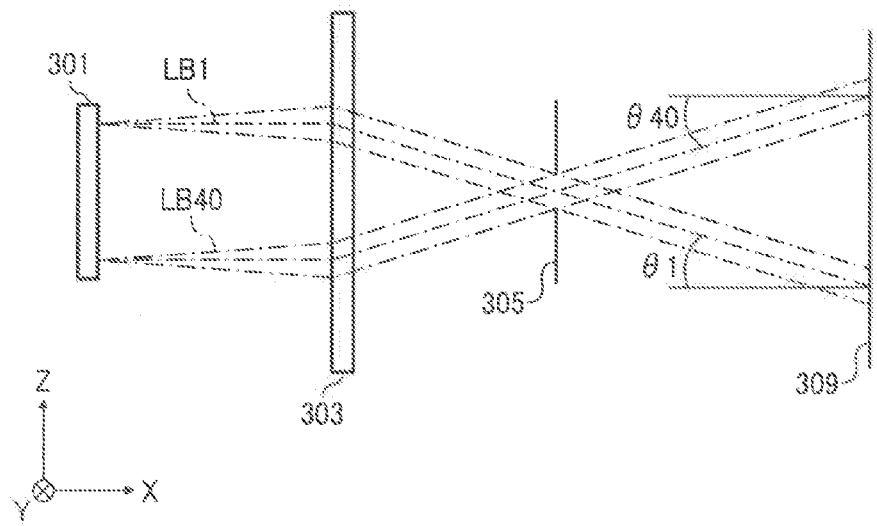
FIG. 9 is an overhead view of the optical scanning device shown in FIG. 7 for explaining which optical paths beams pass along and how the beams are incident on a deflecting surface of a polygon mirror shown in FIG. 7.

FIG. 9 is an overhead view of the optical scanning device 100A for explaining which optical paths beams pass along near the polygon mirror 309 and how the beams are incident on a deflecting surface of the polygon mirror 309. Specifically, the optical paths of beams LB1 and LB40 are as shown in FIG. 9 given that coordinates of the light-emitting points shown in FIG. 8 from which the beams LB1 and LB2 are emitted correspond respectively to the largest and the smallest points with respect to the main scanning direction (Y direction) and the sub scanning direction (Z direction).

As shown in FIG. 9, a plurality of beams emitted from the light source 301 all enters the collimating lens 303 and is substantially collimated. Because the beams are emitted from the two-dimensional array of light-emitting points, a principal ray of a beam incident on the collimating lens 303 from outside the axis of the collimating lens 303 is output at an angle different from that at which the principal ray enters the collimating lens 303. Thus, the beams are incident on the polygon mirror 309 at different angles. The beams LB1 and LB40 are incident on the polygon mirror 309 having a rotation angle of 30 degrees respectively at angles of incidence of 29.84 degrees and 30.16 degrees (θ1 and θ2 shown in FIG. 9).

Because the beams are incident on the polygon mirror 309 at different angles, the beams are focused on the surface of the photosensitive element 315 at different positions when the polygon mirror 309 has a specific rotation angle. Incidentally, the beam LB1 incident on the polygon mirror 309 at a small angle with respect to the main scanning direction scans the surface of the photosensitive element 315 at an image height on the +Y side compared with the beam LB40 incident on the polygon mirror 309 at a large angle.

The polygon mirror 309 shown in FIG. 7 rotates counterclockwise and deflects beams on its surfaces to scan the surface of the photosensitive element 315 in the +Y direction. A beam incident on the polygon mirror 309 at a large angle scans the surface of the photosensitive element 315 after a beam incident on the polygon mirror 309 at a small angle scan the surface. The beam incident on the polygon mirror 309 at a large angle is referred to as "following scanning light", and the beam incident on the polygon mirror 309 at a small angle is referred to as "leading scanning light".

Because the angles of incidence of the beams (semiconductor lasers) are different from each other, the width of the writing area that the beams can scan without shading vary depending on the beams. The beam LB1 can scan the writing area within a range from −160.1 millimeters to +165.0 millimeters with respect to a reference point O, and the beam LB40 can scan the writing area within a range from −164.4 millimeters to +161.5 millimeters with respect to a reference point O.

According to the second embodiment, a photodetector is positioned in a writing start position where the following scanning light starts scanning the writing area, and outputs a synchronization signal based on the following scanning light. Based on the synchronization signal, an amount of delay is set and timing for modulating leading scanning light is determined. With this arrangement, the optical scanning device can be downsized.

Figure 10:
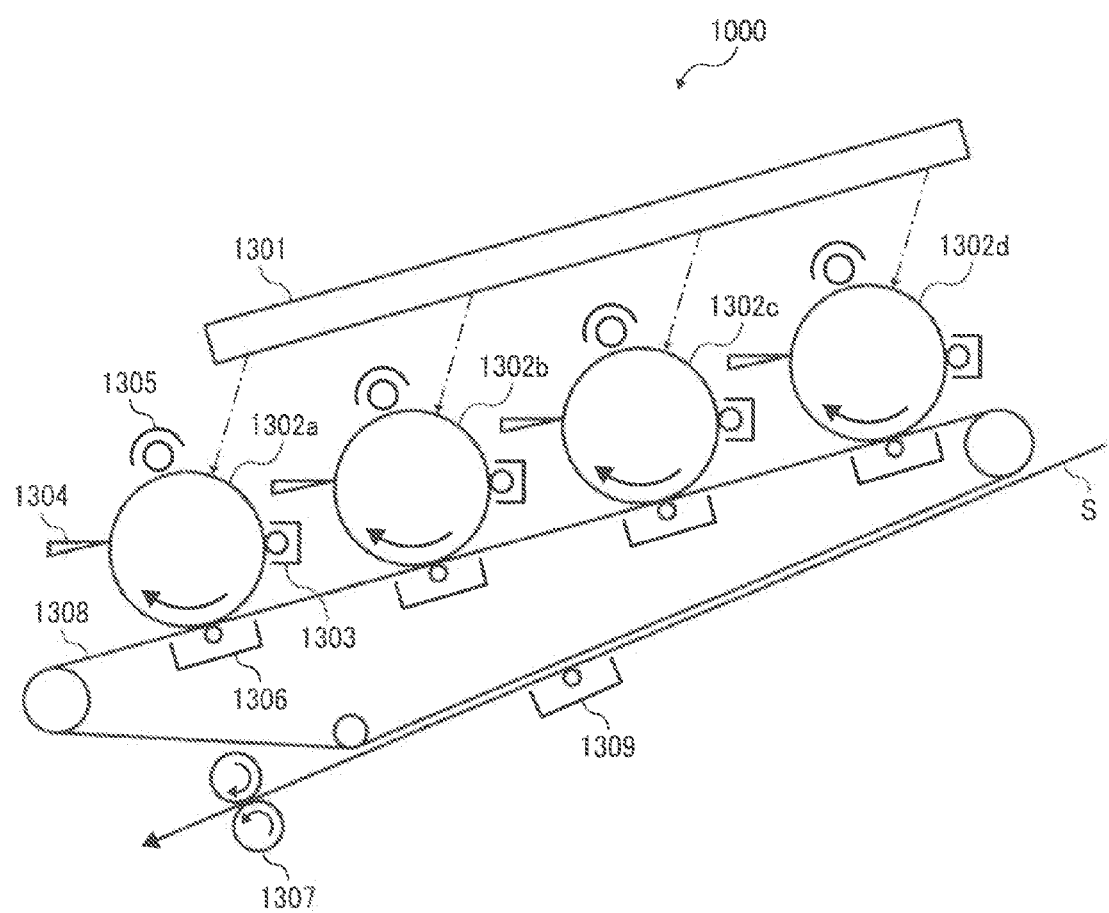
FIG. 10 is a schematic diagram of a typical full-color image forming apparatus.

An image forming apparatus 1000 shown in FIG. 10 includes an optical scanning device 1301 that is of basically the same configuration as the optical scanning device 100A.

By using the optical scanning device 1301, the image forming apparatus 1000 can function as a multicolor image forming apparatus. In the image forming apparatus 1000, a plurality of surfaces are scanned to obtain a plurality of electrostatic latent images corresponding to a plurality of colors. After the electrostatic latent images are developed into visible images, the images are superimposed, so that a color image is formed.

Photosensitive elements 1302a to 1302d of the image forming apparatus 1000 rotate clockwise as indicated by arrows in FIG. 10 at a constant speed. The surfaces of the photosensitive elements 1302a to 1302d are uniformly charged by a charging device 1305, and scanned by the optical scanning device 1301 as the image forming apparatus 200 so that electrostatic latent images are formed on the surface of the photosensitive elements 1302a to 1302d. The electrostatic latent images are developed with toner as toner images by a developing device 1303. The toner images are sequentially transferred onto an intermediate transfer belt by transfer units 1306 and superimposed thereon as full a color image, and the full color image is transferred onto a sheet S by a transfer unit 1309.

The photosensitive elements 1302a to 1302d correspond to any one of colors: cyan (C), magenta (M), yellow (Y), and black (K). In the second embodiment, photosensitive elements 1302a to 1302d correspond to Y, M, C, and K, respectively. It is preferable that optimum correspondence between photosensitive elements and these colors be selected depending on levels of intensity or visibility of colors for a photosensitive element that is in a position where it is difficult to improve scanning quality or a photosensitive element for which steps for, for example, adjustment are to be reduced.

As explained above, according to the first and second embodiments, following scanning light is received to generate a synchronization signal at the writing start position. Therefore, the optical scanning device does not increase in size, which prevents an increase in size of the image forming apparatus.

The following scanning light and the leading scanning light can be received to generate synchronization signals at the writing start position and a position where writing is stopped. This makes it possible to detect chronological variation in magnification in real time and adjust the magnification.

The coupling lenses and the lenses for forming a linearly image can be made of glass, or resin for cost reduction. If the lenses are made of resin, a diffractive-optical element can be used to reduce degradation of the optical performance.

Although the polygon mirror is used for deflecting a beam, a micro mirror for resonant oscillation or a Galvano mirror can also be employed.

Although the optical scanning device is explained above as being applied to a printer, it can be applied to other image forming apparatuses such as a copier, a facsimile machine and a multifunction product (MFP).

According to an aspect of the present invention, among beams before scanning a writing area, a beam, which is to be incident on a point on a side of the writing area where beams tend not to be shaded, is used for a synchronization signal to modulate the beams. Thus, a beam can be incident on the deflecting surface at a large angle compared with a case where beams are modulated in synchronization with a signal based on a beam to be incident on a point more close to the writing area. In addition, because the deflecting unit and the surface to be scanned can be positioned closely, the optical scanning device can be downsized, resulting in the downsizing of an image forming apparatus.

Light sources in a center position out of a plurality of light sources arranged one-dimensionally or two-dimensionally tend to be affected by heat, and luminance output and oscillation wavelength of beams output from the light sources become unstable. For this reason, to scan the surface of the photosensitive element with a plurality of beams, it is generally preferable that a synchronization signal be based on a beam out of the beams on an end side in the main scanning direction because a stable synchronization signal can be generated based on the beams on the end side. The positions of the optical units in this method inhibit the beams from being shaded.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
a deflecting unit that deflects a plurality of beams in a main scanning direction to a writing area of a surface to be scanned for scanning the writing area, wherein the plurality of beams include a leading beam and a following beam, the leading beam is incident on a surface of the deflecting unit, the surface of the deflecting unit when deflecting the leading beam forming a first angle with respect to the main scanning direction, and the following beam is incident on the surface of the deflecting unit, the surface of the deflecting unit when deflecting the following beam forming a second angle with respect to the main scanning direction main scanning direction, the second angle being smaller than the first angle;
a first sensor that detects the plurality of beams deflected by the deflecting unit to be incident on a point on a first side of the writing area, and outputs a signal in response to each of detected beams including the leading beam and the following beam; and
a modulating system that starts modulating the plurality of beams in synchronization with a timing when the first sensor detects the following beam after detecting the leading beam; and
a second sensor that detects the plurality of beams deflected by the deflecting unit incident on a point on a second side of the writing area, and outputs a signal in response to each of detected beams including the leading beam and the following beam, wherein the modulating system detects completion of scanning of the writing area in synchronization with a timing when the second sensor detects the leading beam.

2. The optical scanning device according to claim 1, further comprising a plurality of light sources that emit the beams.

3. The optical scanning device according to claim 1, further comprising a light source that includes a plurality of light-emitting points for emitting the beams.

4. The optical scanning device according to claim 3, wherein the light-emitting points are two-dimensionally arranged in a first direction having a predetermined angle with respect to the main scanning direction and a second direction perpendicular to the first direction.

5. The optical scanning device according to claim 2, wherein the light source includes at least one of a vertical cavity surface emitting laser and a vertical cavity surface emitting laser array.

6. The optical scanning device according to claim 3, wherein the light source includes at least one of a vertical cavity surface emitting laser and a vertical cavity surface emitting laser array.

7. The optical scanning device according to claim 2 wherein the light source includes at least one of a surface emitting laser and a surface emitting laser array.

8. The optical scanning device according to claim 3 wherein the light source includes at least one of a surface emitting laser and a surface emitting laser array.

9. The optical scanning device according to claim 2, wherein
the first sensor detects at least two of the beams, and outputs a signal in response to detected beams, and
the modulating system starts modulating the beams in synchronization with the signal output from the first sensor.

10. An image forming apparatus, comprising:
an optical scanning device including
a deflecting unit that deflects a plurality of beams in a main scanning direction to a writing area of a surface to be scanned for scanning the writing area, wherein the plurality of beams include a leading beam and a following beam, the leading beam is incident on a surface of the deflecting unit, the surface of the deflecting unit when deflecting the leading beam forming a first angle with respect to the main scanning direction, and the following beam is incident on the surface of the deflecting unit, the surface of the deflecting unit when deflecting the following beam forming a second angle with respect to the main scanning direction, the second angle being smaller than the first angle;
a first sensor that detects the plurality of beams deflected by the deflecting unit to be incident on a point on a first side of the writing area, and outputs a signal in response to each of detected beams including the leading beam and the following beam; and
a modulating system that starts modulating the plurality of beams in synchronization with a timing when the first sensor detects the following beam after detecting the leading beam; and
a second sensor that detects the plurality of beams deflected by the deflecting unit incident on a point on a second side of the writing area, and outputs a signal in response to each of the detected beams including the leading beam and the following beam, wherein the modulating system detects completion of scanning of the writing area in synchronization with a timing when the second sensor detects the leading beam;
a photosensitive element having the surface to be scanned on which an electrostatic latent image is formed based on image data;
a developing unit that develops the electrostatic latent image into a toner image;
a transfer unit that transfers the toner image onto a recording medium; and
a fixing unit that fixes the toner image on the recording medium.

11. An image forming apparatus, comprising:
an optical scanning device including
a deflecting unit that deflects a plurality of beams in a main scanning direction to a writing area of a surface to be scanned for scanning the writing area, wherein the plurality of beams include a leading beam and a following beam, the leading beam is incident on a surface of the deflecting unit, the surface of the deflecting unit when deflecting the leading beam forming a first angle with respect to the main scanning direction, and the following beam is incident on the surface of the deflecting unit, the surface of the deflecting unit when deflecting the following beam forming a second angle with respect to the main scanning direction, the second angle being smaller than the first angle;

a first sensor that detects the plurality of beams deflected by the deflecting unit to be incident on a point on a first side of the writing area, and outputs a signal in response to each of detected beams including the leading beam and the following beam; and a modulating system that starts modulating the plurality of beams in synchronization with a timing when the first sensor detects the following beam after detecting the leading beam;

a second sensor that detects the plurality of beams deflected by the deflecting unit incident on a point on a second side of the writing area, and outputs a signal in response to each of the detected beams including the leading beam and the following beam, wherein the modulating system detects completion of scanning of the writing area in synchronization with a timing when the second sensor detects the leading beam;

a plurality of photosensitive elements each having the surface to be scanned on which an electrostatic latent image is formed based on image data to obtain electrostatic latent images of different colors;

a developing unit that develops the electrostatic latent images into toner images;

a transfer unit that transfers the toner images onto a recording medium in a superimposed manner to form a multicolor image; and a fixing unit that fixes the multicolor image on the recording medium.

* * * * *